United States Patent [19]

Lang

[11] 4,404,364

[45] Sep. 13, 1983

[54] OPTIMUM METHOD OF MILLING RUBBER

[75] Inventor: William C. Lang, Kent, Ohio

[73] Assignee: The General Tire & Rubber Company, Akron, Ohio

[21] Appl. No.: 371,346

[22] Filed: Apr. 23, 1982

Related U.S. Application Data

[63] Continuation-in-part of Ser. No. 173,940, Jul. 31, 1980, abandoned, which is a continuation-in-part of Ser. No. 103,128, Dec. 13, 1979, abandoned, which is a continuation of Ser. No. 971,977, Dec. 21, 1978, abandoned, which is a continuation of Ser. No. 871,291, Jan. 23, 1978, abandoned.

[51] Int. Cl.³ .................................................. C08F 6/00
[52] U.S. Cl. ................................... 528/502; 260/816 R
[58] Field of Search ........................... 528/502; 260/816

[56] References Cited

U.S. PATENT DOCUMENTS

| | | | |
|---|---|---|---|
| 1,850,450 | 3/1932 | Denmire | 425/201 |
| 2,431,473 | 11/1947 | Flynn | 165/14 |
| 3,376,601 | 4/1968 | Seanor et al. | 18/2 |
| 3,420,808 | 1/1969 | Mathis et al. | 528/502 |

FOREIGN PATENT DOCUMENTS

| | | |
|---|---|---|
| 733436 | 3/1943 | Fed. Rep. of Germany . |
| 913697 | 6/1954 | Fed. Rep. of Germany . |
| 1035890 | 4/1956 | Fed. Rep. of Germany . |
| 1160602 | 1/1961 | Fed. Rep. of Germany . |

OTHER PUBLICATIONS

CA, 30, 1146(7), 1944.
Vanderbilt Rubber Handbook, R. T. Vanderbilt Co., Inc., R. O. Babbit, Editor, (1978), pp. 435, 439, 443, 444.
Akron Rubber Group Inc., Technical Symposiums, pp. 33–39, (1975–1976) McCloud D.W.
Chem. Eng. Handbook, 3rd Ed., p.1677 (1950).

*Primary Examiner*—Stanford M. Levin

[57] ABSTRACT

By varying the temperature and/or the flow rate of water passing through rubber mill rolls and measuring the stock temperature of the rubber being milled, the optimum flow rate and water temperature to be used in cooling the mill can be obtained. The desired stock temperature range is predetermined by a compounding chemist and the optimum flow rate and water temperature is determined by the energy costs involved in running the mill.

1 Claim, 4 Drawing Figures

OPTIMUM METHOD OF MILLING RUBBER

RELATED APPLICATION

This is a continuation-in-part of application Ser. No. 173,940 filed July 31, 1980, which is a continuation-in-part of application Ser. No. 103,128 filed Dec. 13, 1979 which is a continuation of application Ser. No. 971,977 filed Dec. 21, 1978 which in turn is a continuation of application Ser. No. 871,291 filed Jan. 23, 1978; all abandoned.

BACKGROUND OF THE INVENTION

1. Field of the Invention

The present invention is directed to a method of determining the optimum flow rate and the optimum water temperature from an energy consumption standpoint to be used in the operation of a rubber roll mill and the use of such optimum conditions in the operation of the mill.

2. DESCRIPTION OF THE PRIOR ART

In the manufacture of rubber products, rubber compounds are generally first mixed in a Banbury. The Banbury, until recently, was cooled by flowing cold water through it during the winter months and warm water during the summer. At the present time, the Banbury is cooled by passing warm water through the Banbury all year long. This has resulted in a higher through-put of the Banbury as compared to the previous cold water process. The process is described in an article by D. W. McCloud, "The Advantages of Farrel Tempered Water System When Used With A High Heat Transfer Banbury With Drilled Sides", Akron Rubber Group Inc., Technical Symposiums 1975-1976.

The materials utilized by the rubber compounder can be classified into nine major categories. They are:

Elastomers: The basic component of all rubber compounds, it may be in the form of rubber alone or "masterbatches" of rubber-oil, rubber-carbon black, or rubber-oil-carbon black, or reclaimed rubber. Combinations or blends as given in the synthetic tire tread recipe are quite common. The elastomers are selected in order to obtain specific physical properties in the final product.

Processing Aids: Materials used to modify rubber during the mixing or processing steps, or to aid in a specific manner during extrusion, calendering, or molding operations.

Vulcanization Agents: These materials are necessary for vulcanization, since without the chemical crosslinking reactions involving these agents, no improvement in the physical properties of the rubber mixes can occur.

Accelerators: In combination with vulcanizing agents, these materials reduce the vulcanization time (cure time) by increasing the rate of vulcanization. In most cases, the physical properties of the products are also improved.

Accelerator Activators: These ingredients form chemical complexes with accelerators, and thus aid in obtaining the maximum benefits from an acceleration system by increasing vulcanization rates and improving the final product properties.

Age-resistors: Antioxidants, antiozonants, and other materials that are used to reduce aging processes in vulcanizates. They function by slowing down the deterioration of rubber products. The deterioration occurs through reaction with materials that catalyze rubber failure, i.e., oxygen, ozone, light, heat, radiation, etc.

Fillers: These materials are used to reinforce or modify physical properties, impact certain processing properties, or reduce cost.

Softeners: Any material that is added to rubber to either aid mixing, promote greater elasticity, produce tack, or extend (or replace) a portion of the rubber hydrocarbon (without a loss in physical properties), can be classified as a softener.

Miscellaneous Ingredients: Materials that can be used for specific purposes but are not normally required in the majority of rubber compounds can be included in this group. Included are retarders, colors, blowing aids, abrasives, dusting agents, odorants, etc. Solvents are not used as they create air pollution, an explosion danger and render the rubber compound tacky to process on the mill.

By roll mill is meant any mill having two or more rolls used to mix rubber compound. The term mill includes four roll L, Z and inverted L Calenders used as mills, and roll mills normally used in the rubber industry to mill rubber or rubber compounds. As contemplated by the invention the mill has at least one roll which is internally water cooled.

After the rubber and some or all of the ingredients are mixed in the Banbury, the material is milled on one or more roll mills. Ingredients not added at the Banbury mixer are usually added at one of the milling stages. The mill rolls are cooled by passing cold water through them. The rubber being processed has a memory of its heat history. If the rubber is maintained at too high a temperature for too long of a period (total heat history), it will scorch. When scorching problems were encountered, one solution has been to use colder water in the mill rolls.

In some instances mechanical refrigeration units employing Freon refrigerant gas to cool the cooling water passing through the mills have been installed.

The use of refrigerated water in mill rolls has resulted in substantial expense and energy consumption in the operation of the refrigerating units. The extreme cooling has also increased the stiffness of the rubber being milled which has resulted in the mill motors working harder, thus, consuming more energy. In some instances where cold water from wells was plentiful and cheap, large quantities of cold water were used and discharged. Water treatment to prevent mill corrosion, however, in these instances was quite expensive.

SUMMARY OF THE INVENTION

It was unexpectedly discovered that by varying the temperature of the cooling water in the roll mill that stock temperatures could actually be decreased by increasing the cooling water temperature at a constant flow rate. It was also discovered that by increasing the flow rate at constant temperature that stock temperatures could be significantly reduced. The phenomenon of stock temperature reduction with increasing cooling water temperature occurs only at specific point of the stock temperature vs. mill surface temperature relationship.

From an energy conservation point of view it is desirable to obtain the minimum differential between the stock temperature and the mill surface temperature or to work under those conditions where the stock temperature decreases with an increase in mill surface temperature up to and slightly beyond the point where stock temperature increases with an increase in mill surface temperature.

At conditions of this minimum differential it is possible to operate a roll mill to reduce substantially the energy requirements necessary for milling uncured rubber compound.

(a) The cooling water flow rate is optimized by varying the flow rate from 0.0159 m$^3$ water/m$^2$/min. of internal mill surface area per minute to 0.1233 m$^3$/m$^2$/min. (or 0.0111 m$^3$/m$^2$/min. of external mill surface area to 0.0855 m$^3$/m$^2$/min.), at a fixed temperature of greater than 20° C., through each of the one or more mill rolls to establish the flow rate at which further increases do not significantly decrease the differential between stock temperature and the cooling water temperature in the range of 74° C. (165° F.) to 121° C. (250° F.); and (b) repeating step (a) at one or more additional different fixed temperatures of at least 20° C. to establish the temperature at which further increases in temperature do not materially decrease the differential between the stock temperature and the cooling water temperature and which results in a stock temperature in the range of 74° C. to 121° C.

(c) based upon the results of (a) and (b) a cooling water temperature and a flow rate which provide the lowest stock temperature-cooling water temperature differential ±20° C. and a stock temperature of from 74° C. to 121° C. is chosen.

(d) the mill is operated at the chosen water temperature and flow rate.

The flow rate varies somewhat based upon the size of the mill roll and whether the mill is drilled or cored. A drilled roll requires less water than a cored roll. In any event, it is necessary that the water be in turbulent flow.

The preferred stock temperature-cooling water temperature differential is ±10° C. from the lowest stock temperature-cooling water differential. Another preferred cooling water temperature is a temperature within the range wherein the stock temperature decreases with an increase in cooling water temperature. The preferred stock temperature during milling is from 82° to 113 C.

Steps (a) or (b) may be eliminated but it is prefered that they not be eliminated.

Instead of using the stock temperature-water temperature differential as the criteria for optimum operating conditions for the mill, the minimum energy requirements for driving the mill rolls for a given through-put can be used to determine the optimum operating conditions. Optimum operating conditions refers to cooling water temperature or flow rate or both.

BRIEF DESCRIPTION OF THE DRAWINGS

FIG. 1b is a top view of the apparatus of FIG. 1a.

DESCRIPTION OF THE PREFERRED EMBODIMENTS

The apparatus of the present invention and its operation will now be described in conjunction with the drawings.

Figure 1A:
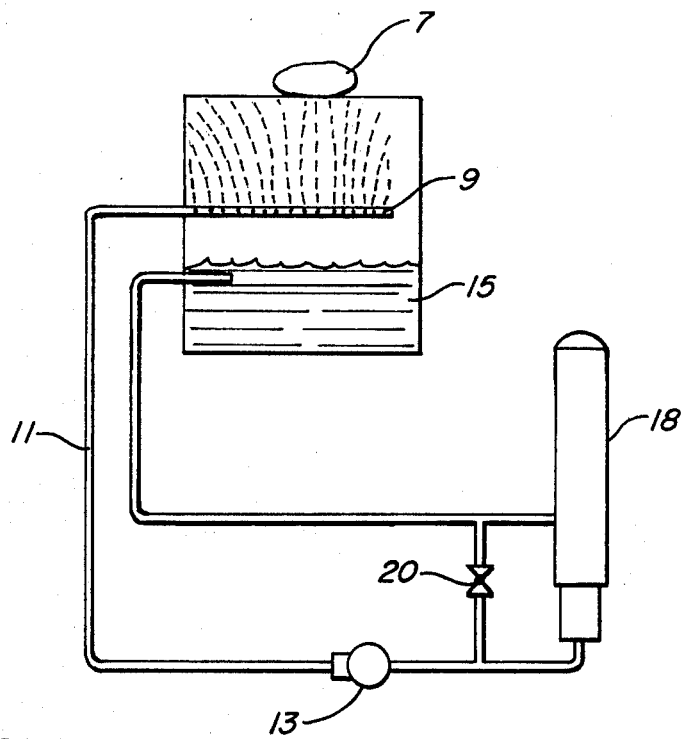
FIG. 1a is a schematic diagram, partial in cross-section, of a roll mill in combination with a variable volume water pump and a variable temperature water supply. A water recycle loop is also included to limit the total volume of water pumped through the system.
Figure 1B:
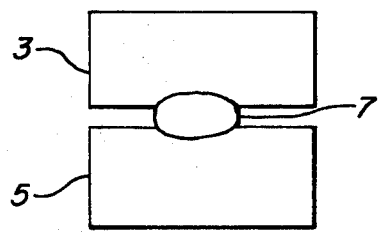

FIGS. 1a (side) and 1b (top) are directed to a water cooled rubber mill; the mill has two rolls 3 and 5. The rolls are 27 inches in diameter and 84 inches long. A mass of rubber in its uncured state 7 is positioned on the rolls. The mill is internally cooled by a water spray 9. The water is pumped into the mill through conduit 11 by variable volume pump 13. The water 15 collects in the bottom of the mill rolls and is returned to a cooling tower 18. A variable valve 20 is positioned so as to bypass cooling tower 18.

Figure 2:
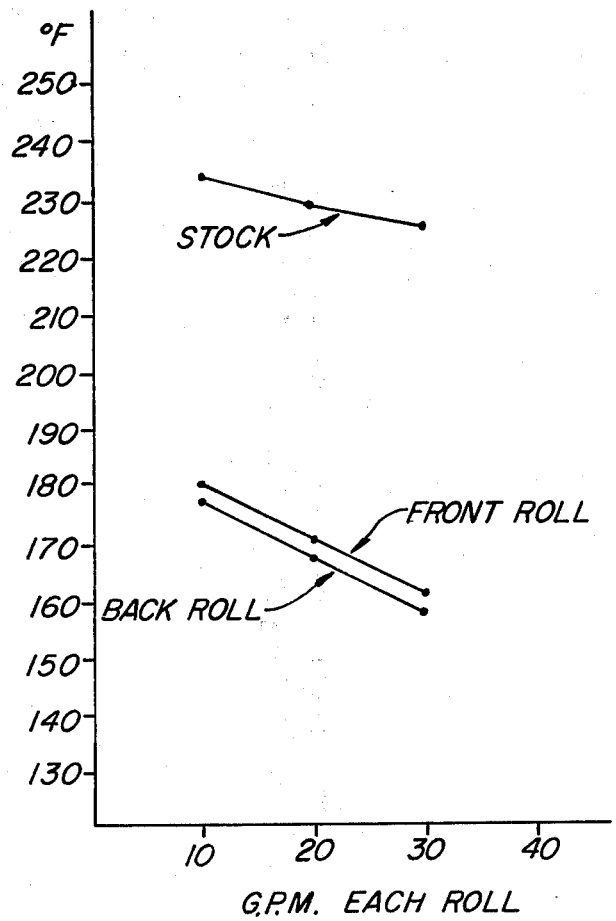
FIG. 2 is a graph showing the variation of the stock temperature as the volume of cooling water through the mill is increased.

FIG. 2 shows the effect of varying the cooling water flow rate while maintaining the cooling water at a constant temperature. The optimum flow rate is established at a constant water temperature. The water temperature is arbitrarily chosen for the first flow rate determination. In the present case 30 gpm provided the best cooling for the volume range studied.

Figure 3:
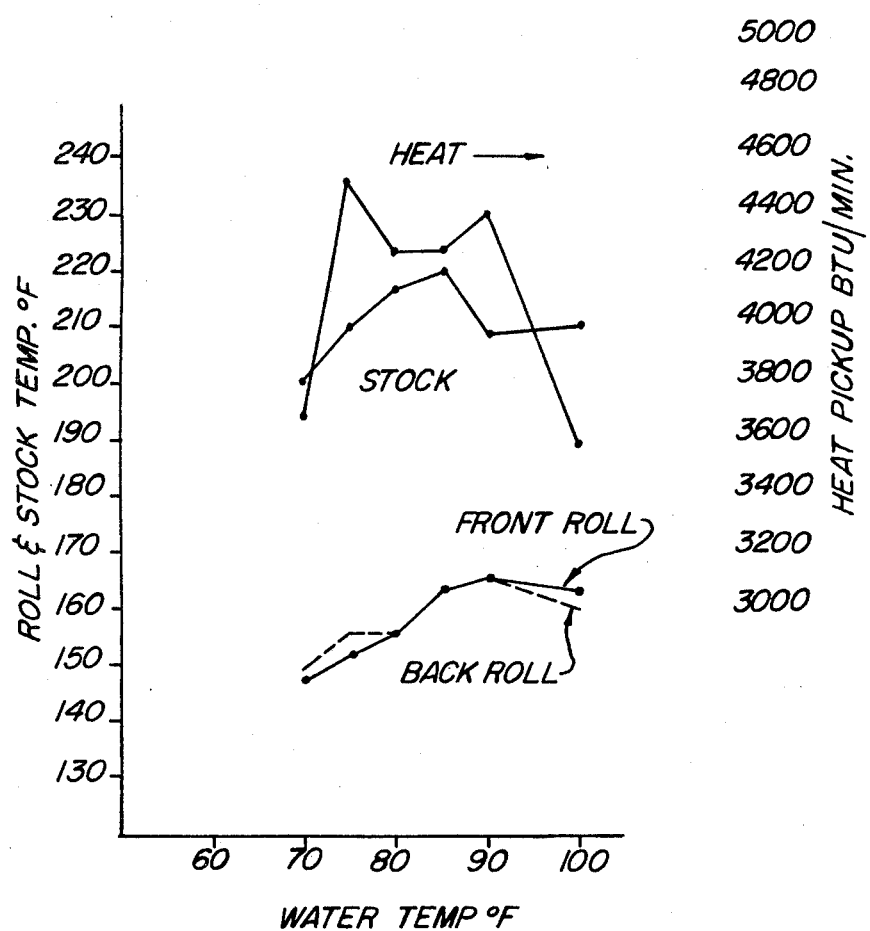
FIG. 3 is a graph showing the variation of stock temperatures as the cooling water temperature is gradually increased at a constant flow rate through the mill. The shape of the graph will vary with the rubber compound being milled.

As is shown in FIG. 3, the temperature of the cooling water was varied by the operation of valve 20 which allows a partial recycle of hot water coming from the mill while the volume of water pumped through the mill was held constant by pump 13 to 30 gallons per minute (0.0369 m$^3$/m$^2$/min. internal 0.0256 m$^3$/m$^2$/min. external mill surface). As is shown by the stock temperature graph of FIG. 3, the stock temperature increased from 93° C. (200° F.) to 103° C. (217.4° F.) as the water temperature increased from 21° C. (70° F.) to 27° C. (80° F.). As the water temperature increased from 30° C. (85° F.) to 32° C. (90° F.) the stock temperature dropped from 103° C. (217.4° F.) to 97° C. (207° F.), then stabilized with slight temperature increases when the water temperature was increased from 32° C. (90° F.) to 37° C. (99° F.). The stock temperature was 97° C. (207° F.) at a water temperature of 32° C. (90° F.). The differential between the water temperature and the stock temperature was 48° C. (118° F.). This point is the beginning of the minimum differential range obtainable from the graph. As the water temperature increased to 37° C. (99° F.), the stock temperature increased to 100° C. (212° F.), a differential of 44° C. (111° F.).

The graph above the stock temperature graph is the heat graph which depicts the amount of heat being removed from the milled rubber. The amount of heat being removed also reaches a peak at a water temperature of about 32° C. (90° F.) and then drops. The temperature of the front and back mill rolls are also indicated on the graph. The mill roll temperature at temperatures above the minimum differential between the stock temperature and the water temperature is increased.

The graphs (FIG. 2 and FIG. 3), depict the results obtained with a particular rubber stock. Other rubber stocks would produce results which would be somewhat different but similar.

After the optimum cooling water flow rate and the optimum cooling water temperature have been determined, the mill is operated at the cooling water temperature and at that flow rate. Optionally, the flow rate determination can be redetermined at the optimum temperature established, optionally followed by a redetermination of the optimum temperature.

Because most of the water is recycled, there is also a significant savings in the quantity of water used in plants which previously used a once-through system. Energy is also saved because when the prior art refrigerated water was used, a large amount of energy was required for refrigeration and the rubber stock required more energy to mill due to its higher viscosity at the mill roll surface.

The mills employed are preferably drilled, i.e., cast as a solid roll and then water channels are drilled in the roll. The rolls can also be cased around a sand core with or without machining the rough interior. The mills are commercially available from Steward Bolling, and Farrel, among others. The mills, except for the temperature and flow of cooling water, are operated in a conventional manner.

The variable volume pump used is a commercial centrifugal pump.

The variable bypass valve used is also a commercial valve. The cooling tower is also a conventional water evaporative cooling tower. The cooling tower capacity is dependent upon the volume of water used. The heated water coming from the mill can also be cooled by heat exchange with cold air or the cold water supply coming into the factory.

The components are normally selected by an engineer to suit particular mills or a particular plant. Variations such as the quantity and quality of the water source, water temperature, etc., are deciding factors in the selection of equipment.

I claim:

1. An energy efficient method of compounding a rubber stock on the rolls of an internally cooled rubber mill in a compounding zone on said mill comprising (1) optimizing the cooling water flow rate by varying the flow rate from 0.0159 $m^3$ water/$m^2$/min. of internal mill surface area per minute to 0.1233 $m^3/m^2$/min. (or 0.0111 $m^3/m^2$/min. of external mill surface area to 0.0855 $m^3/m^2$/min.) at a temperature above 20° C. to establish the flow rate at which further increases in water flow rate do not significantly decrease the difference between the stock temperature and the cooling water at constant temperature with stock temperature in the range of 74° C. (165° F.) to 121° C. (250° F.), (2) then increasing the temperature of the cooling water at said optimum constant flow rate at one or more additional different fixed temperatures of at least 20° C. to establish the temperature at which further increases in temperature do not materially descrease the differential between the stock temperature and the cooling water temperature and to obtain an optimum cooling water temperature with a stock temperature in the range of 74° C. to 121° C. and (3) operating said mill at said optimum cooling water flow rate and said optimum cooling water temperature to compound said stock at a temperature of the stock below the scorch temperature of the stock in the range of 74° C. to 121° C. and to conserve energy, said water being in turbulent flow.

* * * * *